Aug. 12, 1947.　　　M. WATTER　　　2,425,498
AIRPLANE
Filed July 18, 1942　　　3 Sheets-Sheet 1

INVENTOR
Michael Watter.
BY John P. Tarbox
ATTORNEY

Aug. 12, 1947.   M. WATTER   2,425,498
AIRPLANE
Filed July 18, 1942   3 Sheets-Sheet 2
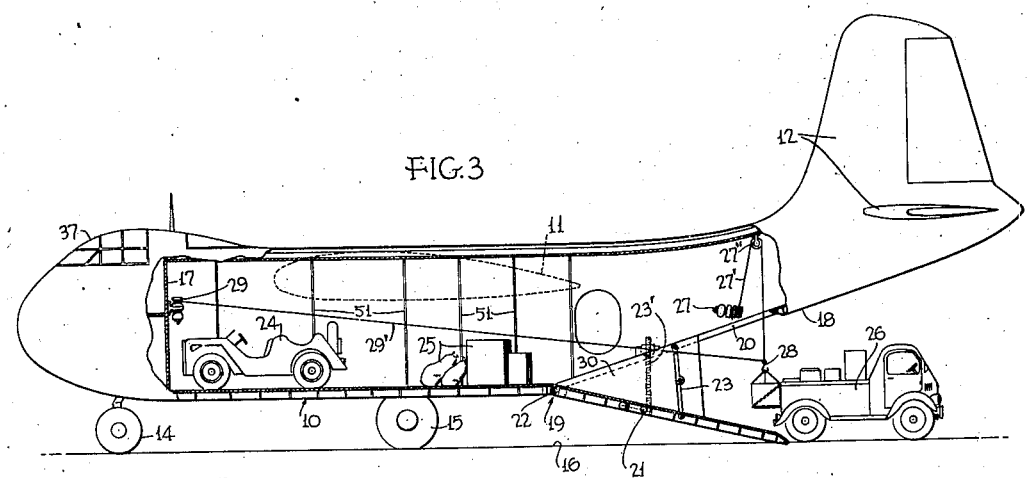
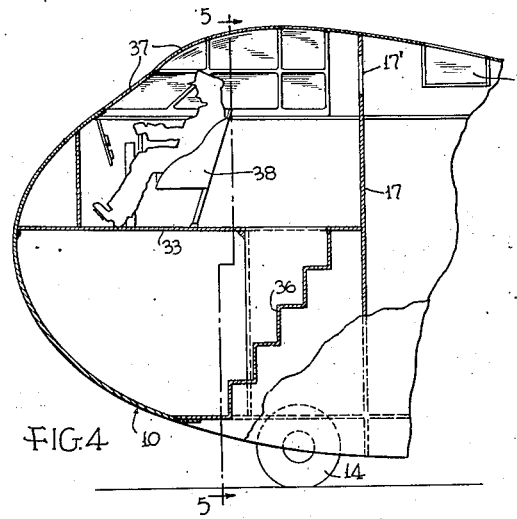
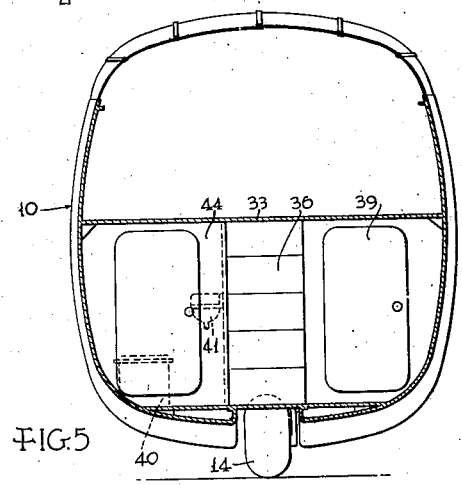
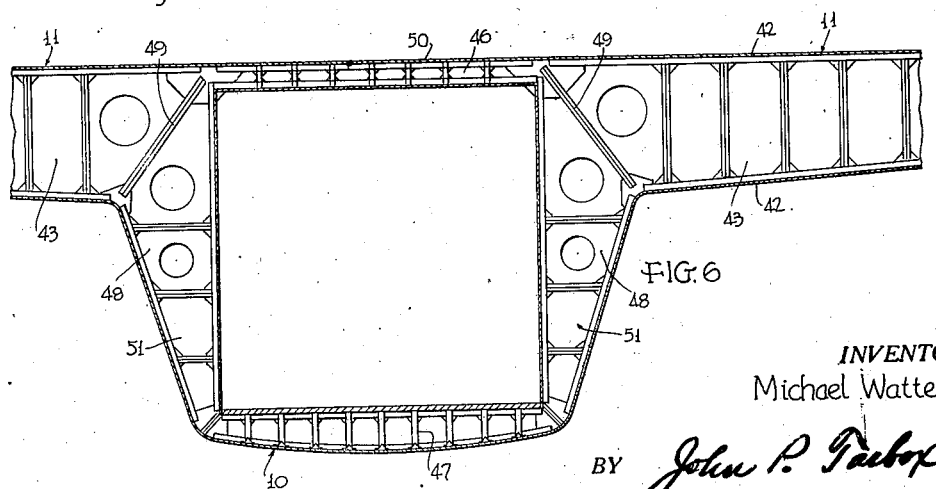
INVENTOR
Michael Watter.
BY John P. Taulor
ATTORNEY Aug. 12, 1947.        M. WATTER        2,425,498
AIRPLANE
Filed July 18, 1942        3 Sheets-Sheet 3

INVENTOR
Michael Watter
BY *John P. Fairbop*
ATTORNEY

Patented Aug. 12, 1947

2,425,498

UNITED STATES PATENT OFFICE 2,425,498

AIRPLANE

Michael Watter, Philadelphia, Pa., assignor to The Budd Company, Philadelphia, Pa., a corporation of Pennsylvania Application July 18, 1942, Serial No. 451,390

6 Claims. (Cl. 244—137)

The invention relates to airplanes and more particularly to the cargo-carrying type of airplanes.

It is a main object of the invention to provide an airplane of this class which is designed to carry a maximum of cargo load and at the same time is easy to handle under all load conditions and also possesses a high aerodynamic efficiency.

It is a further object to provide an airplane of this class which can readily be converted from peacetime use to wartime use, i. e., it is equally adapted to carry bulk cargo or live cargo, such as parachute troops or other task forces to be landed in enemy territory, together with the equipment which such task forces require, including motor vehicles, guns and gun mounts, etc.

It is a further object to provide an airplane of this class which is designed to facilitate the loading and unloading of the cargo space thereof, particularly so that the unloading of cargo, such as troops and rolling cargo, may commence even before the plane has rolled to a stop in landing.

It is a further object to so construct the airplane that it may be readily manufactured out of sheet metal, such as light gauge stainless steel, whereby light weight with high strength and low ultimate cost considering the added life to be expected due to the use of this material, may be attained.

It is a further object to provide novel and highly efficient accommodations for the crew, affording a large angle of vision and safety in the event of a crash landing.

It is a further object of the invention to combine elements of the cantilever wing structures with the body structure to which they are secured so as to enclose a large cargo space with a minimum of overall cross-section of the body, and particularly with a minimum of height.

These objects are achieved in large part by having a longitudinal cargo space enclosed by the main body of the plane so that the center of said space is substantially in the vertical line of the resultant lift of the supporting surfaces. these surfaces are preferably cantilever wings having vertically extending root portions at their inboard ends, and these root portions form the sides of centrally open bulkheads enclosing the cargo space and disposed within the outer contours of the body. The bulkheads are completed around the cargo space by transverse braces interconnecting the vertically extending root portions of the respective wings across the top and bottom of said space. The body is extended rearwardly of the cargo space by a tail portion having a longitudinally extending opening in its bottom wall which communicates directly with the cargo space. This arrangement facilitates the loading and unloading of said cargo space.

The loading and unloading opening is normally closed by closure means comprising a door which is hinged at the forward margin of the opening, and serves when lowered as a loading platform or ramp over which the cargo can be conveniently loaded and unloaded. When the free end of the door is supported from the ground it can be used as a ramp to drive motor vehicles into and discharge them from the cargo space, and this discharge can be carried out while the plane is rolling to a stop in landing, so that no time is lost in discharging the cargo. This is particularly important in wartime, when unloading task forces in the enemy territory. Preferably the door opening is of substantially the full cargo space width, whereby the loading and unloading can be carried out for the full width of said space.

The control or pilot's compartment is preferably arranged forward of a transverse bulkhead dividing the cargo space from the rounded nose portion of the body. The floor of this compartment is preferably a substantial distance below the top of the cargo space but above the major portion of the cargo space, so that the pilot and other members of the screw in the pilot's compartment are protected from injury by forwardly shifting cargo in the event of a crash landing. At the same time, the top of the pilot's compartment projects but slightly above the main body, and therefore does not materially increase the overall height of the body. In order to insure a maximum range of vision in all directions, the top of the pilot's compartment may be formed with a shallow dome rising from the top of the cargo space, suitable windows being provided in this domed portion.

Preferably, particularly in the smaller type of aircraft, to raise the tail portion above the ground a distance sufficient to permit a vehicle, as a truck, to be moved under the loading opening, the bottom of the tail is angled upwardly from the bottom of the main body, and to avoid all obstruction of the landing gear usually provided under the tail portion, the plane is supported from the ground by a tricycle landing gear, located in advance of the tail portion within the plan projection of which the center of gravity of the plane is located. The tail portion is free of the ground.

To prevent any turning over tendency of the plane in loading and unloading, brace means is provided, which cooperates with the landing gear, to maintain the plane in normal ground attitude during loading and unloading.

For ease of construction the outer contour lines of the main portion of the body of the plane enclosing the cargo space are longitudinally straight and of plane and simple curvature form, and to improve the streamline effect the contour of this main body portion merges gradually with the compound contours of the nose and tail portions.

Other objects and advantages and the manner and means by which they are attained are further clarified by the following detailed description when read in connection with the accompanying drawings forming a part hereof:

In the drawings:

Fig. 3 is a view similar to Fig. 2 with parts broken away and in section, showing the plane in the process of loading;

Fig. 4 is an enlarged fragmentary side view of the nose of the plane, most of the view being in central vertical longitudinal section.

Fig. 5 is a transverse sectional view taken substantially along the line 5—5 of Fig. 4.

Fig. 6 is a fragmentary transverse sectional view through the body and the roots of the wings showing more or less diagrammatically the relation therebetween.

Figure 1:
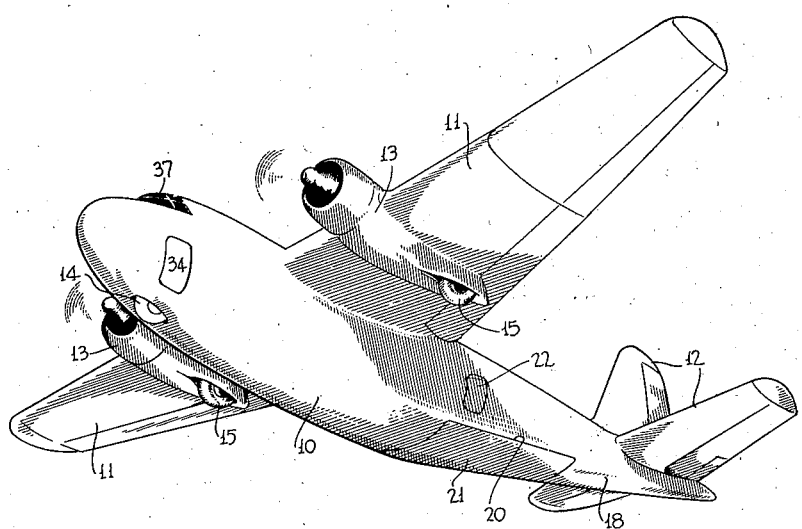
Fig. 1 is a front three-quarter perspective view showing a plane according to the invention as it would appear in flight.

In the preferred embodiment of the invention shown in the drawings, the body of the plane is generally designated by the numeral 10, the cantilever wings by 11, the tail surfaces by 12, the engine nacelles by 13 and the landing gear wheels by 14 and 15. Wheels 14 and 15 constitute a tricycle landing gear. Wheel 14 mounted in the nose of the body 10 may be used as a steering wheel and wheels 15 are laterally spaced main load-carrying wheels mounted in the wings in the vertical plane of the respective engine nacelles 13.

Figure 2:
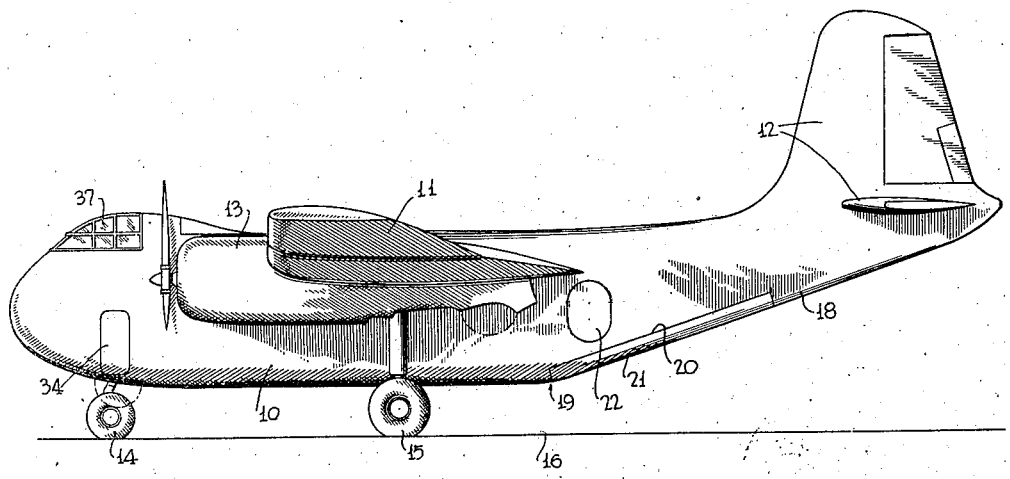
Fig. 2 is a side elevational view thereof when resting on the ground.

The wheels may be, and preferably are, of the retractible type partly or wholly retracted into the body or wings in flight, as shown, for example, in full lines in Fig. 1 and in dotted lines in Fig. 2.

When the plane is resting on the ground with the landing wheels down as shown in Fig. 2, the main portion of the body 10 is spaced from and generally in parallel relation to the ground, indicated in said figure by numeral 16.

The central main portion of the body 10 extending from a transverse bulkhead 17, Fig. 4, to approximately the trailing edges of the wings 11 where they merge with the body, Fig. 2, encloses an elongated clear cargo space, Fig. 3. The center of this cargo space is substantially in the vertical line through the center of lift of the wings, as can be seen by comparing Figs. 1, 2 and 3, the approximate outline of a wing where it joins the body being shown in dotted lines in Fig. 3.

This cargo space is surrounded in the wing securement region by centrally open bulkheads indicated in diagrammatic fashion, at 51, in Fig. 3, and one of them, in transverse alignment with and secured to wing spars 43, being shown in greater detail in Fig. 6. These bulkheads are within the outer contour of the body but are of substantially less cross-sectional area than the cross-sectional area of the cargo space enclosed by them.

The wings 11 each may comprise a main body portion tapering in thickness and width from tip to root and are joined, as at 49, to substantially vertical extensions or wing root portions 48 which form the sides of bulkheads 51. These vertical wing root extensions 48 are preferably tapered from the point of maximum stress adjacent their joinder to the wing body portion to their ends remote from said joint. The bulkheads are completed by vertically shallow braces 46 and 47 flanking the top and bottom of the cargo space and interconnecting the tops and bottoms of the vertical sides 48. These braces 46 and 47 may be made of relatively shallow vertical depth as compared with the depth of the bulkhead sides 48 adjacent their securement to the wing spars 43 because they are not called upon to carry such heavy stresses. The bottom braces, as 47, because they support the flooring 52 of the cargo space, are shown somewhat deeper than the top braces, as 46.

In the preferred form shown, the bulkheads enclose a rectangular cargo space since this shape has certain manufacturing advantages, but it will be understood that the space might have other cross-sectional configurations.

In the form shown, the tops of the wings 11 at their roots are substantially in the plane of the top 50 of the body but this arrangement is not essential, as the wings might have their roots disposed anywhere in the height of the body and still achieve substantially all the advantages of the invention.

To achieve proper streamlining it is desirable that the nose portion of the body extending forward from the cargo space enclosed by the main body portion above described, be given a contour having a compound curvature and the same is to some degree true of the tail portion extending the main body rearwardly and supporting the tail surface 12. However, such compound surfaces are relatively difficult to form, and to avoid any appreciable longitudinal curvature in the main body portion extending from the nose to the tail, the outside contour lines of this portion of the body are substantially longitudinally straight, (see Figs. 1, 2 and 6), the outer surfaces surrounding this main portion of the body being of plane or simple curved form. This construction facilitates the manufacture, since the sheathing may be laid on in longitudinal strips either in plane form or formed with simple curvature. At the ends the plane or simple curved contour of the main body portion is made to merge gradually into the compound curvature of the nose and tail to preserve good streamlining characteristics (see Figs. 1 and 2).

The construction hereinbefore described insures a large cross-section clear cargo space within the external body and wing root contour of minimum height and width, and this space is substantially the maximum clear space obtainable with a plane of a given external contour.

To facilitate the loading and unloading of the cargo space, the bottom of the tail 18 is angled upwardly from its junction with the main body portion enclosing said space (see Fig. 3), and an elongated opening 20 is provided in said bottom which communicates directly with the cargo space. This opening is preferably of substantially the width of the cargo space, so that the cargo can be most expeditiously loaded or unloaded.

The opening is normally closed by closure means comprising a door 21 which is hinged along the forward margin of the opening, as at 19, and when lowered, as shown in Fig. 3, about its hinge, the door serves as a loading or unloading platform or ramp over which vehicles, as 24, or other cargo, as 25, may be transported into or from the plane. The ramp may be of such length and angle with respect to the body bottom that the loading space between the rear edge of the opening and the ramp is of a height substantially equal to the height of the cargo space, thus permitting loading over the ramp of cargo of substantially the full height of said space.

Inside the plane suitable loading and unloading tackle may be provided. For example, a winch 27 in which a cable 27' passing over a pulley 27'' and provided with a hook 28 may be used to lift and lower cargo through the opening 20 either from the ground or from a truck 26, as shown in Fig. 3. The cargo so lifted may be transferred longitudinally forwardly into the cargo space by a cable 29' wound over a winch 29 secured to the forward bulkhead 17 and having its free end secured to the hook 28. Thus it will be seen that by proper manipulation of the winches, bulk cargo, as 25, may be expeditiously loaded and unloaded to and from the cargo space. While a specific means for transfer of the cargo has been shown and described, it will be understood that other known means of cargo transfer could also be used on the plane.

Locking means is provided to lock the door down with its free edge in engagement with or otherwise supported from the ground. In the drawings two forms of such locking means have been shown, but it will be understood that either form might be used without the other or both together.

One such locking means comprises toggles, as 23, secured to the opposite sides of the door and the lateral margins of the opening, which toggles, when straightened out, as shown in Fig. 3, positively lock the door in down position. In this position, the toggles serve as a brace for the rear of the plane and, in cooperation with the landing gear, prevent tilting down of the tail or other over-turning tendency of the plane when loading and unloading the same.

The other locking means for the door is inherent in the type of means used for moving the door from open to closed position and vice versa. As shown most clearly in Fig. 7, this moving means may comprise a prime mover, as motor 53 mounted on the door, preferably between its upper and lower faces, which motor drives a worm 54, extending in the plane of the door, which in turn through appropriate gearing drives two vertical worms, as 23', journalled at their lower ends in the door and at these upper portions screwing into nuts 55 mounted for pivotal movement in sockets, as 56, at the sides of the opening. Appreciable endwise movement of the nuts is prevented by the tops of the sockets. From this arrangement it will be seen that the door can be moved to any position by the motor, but as soon as the motor is stopped it will be automatically locked due to the small pitch of the worms engaging the nuts 55.

Figure 7:
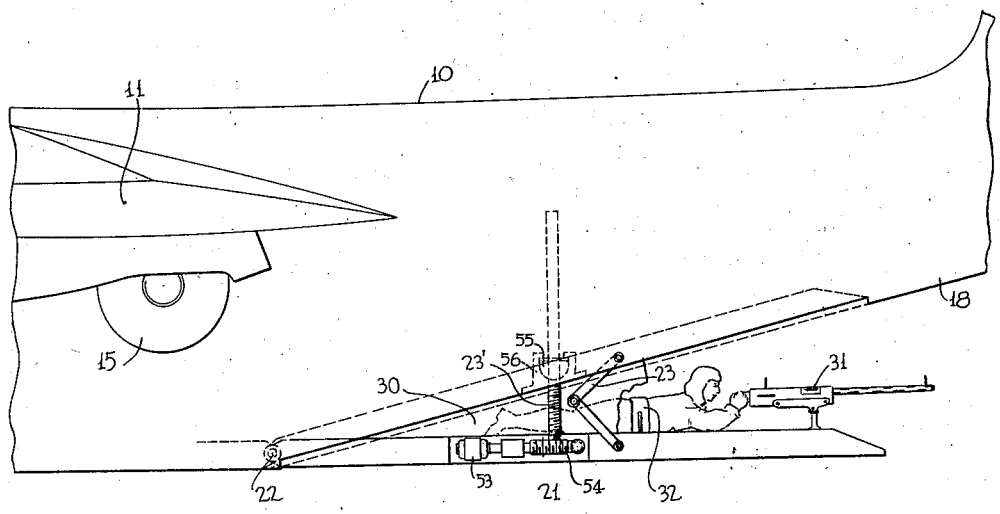
Figs. 7 and 8 are fragmentary side and rear end elevations showing the bottom door of the body in partly open position serving as a gun platform.
Figure 8:
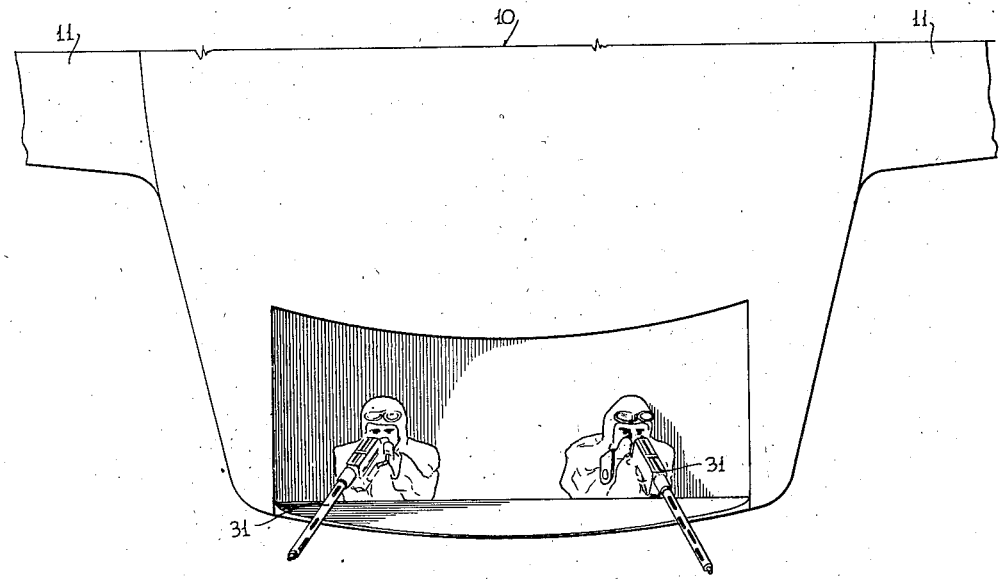

This locking means can be used to lock the door in a partially down position, as shown in Figs. 7 and 8, where the door is shown in position for use in mounting a gun or guns 31 and a support for the operator or operators of the guns. The operators preferably lie on the door in a prone position, as shown, and are secured to the door by a safety belt, as 32. With the guns mounted as shown, they may be trained and fired through a wide angle, both vertically and horizontally. To partially close the gaps between the sides of the door and the opening adjacent the hinged end, canvas or other flexible closure sheets 30 may be employed, as shown in Figs. 3 and 7.

It will thus be seen that the door has a number of uses and as hinged at the front has particular advantages for the quick discharge of task forces, etc., since it can be lowered and the cargo discharged before the plane has come to a stop. Separate means of access and egress from the cargo space may also be had through a side door 22, Figs. 1 and 3.

The nose portion in front of bulkhead 17 is equipped for the safety and comfort of the crew. It is divided by a horizontal partition 33 into an upper pilot's compartment or control room, and into a lower compartment. A doorway 34 is formed in the left-hand side of the lower compartment and a small compartment 44 having a doorway 45 is arranged at the right-hand side. This small compartment contains a toilet and wash basin as indicated at 40 and 41, Fig. 5. A doorway 39 in the bulkhead 17 may provide access from the nose to the cargo space. A stairway 36 centrally of the lower compartment affords access to the upper or pilot's compartment.

The stairway and the bulkhead 17 provide sides of a downwardly opening well, within which the forward wheel 14 of the tricycle landing gear mounted in this region may be partially or wholly retracted.

The floor of the pilot's compartment is arranged, as clearly appears in Fig. 3, a distance below the top of the cargo space so as to bring most of the pilot's compartment vertically within the height of the body, thus adding very little to the overall height of the body above that of the height required for the cargo space. On the other hand, it is raised a sufficient distance above the floor of the cargo space to avoid the major part of shifting cargo, such as would be caused by a crash landing. Thus, the men in the control room are relatively safe from injury through such cause.

Preferably, to increase the head room in the pilot's compartment, and the range of vision of the pilot seated in seat 38, the top of the pilot's compartment is in the form of a shallow dome rising at the rear from the top of the cargo space. Windows 37 at front and sides and a window 37 in the rear of the dome, are provided, to obtain a full range of vision from the pilot's seat. The bulkhead 17 may have an opening 17' in its upper region, of a size to give the pilot a full range of vision through the rear window 35.

While I have herein described a specific embodiment of the invention, it will be understood that changes and modifications may be made by those skilled in the art without departing from the spirit of the invention, and such changes and modifications are intended to be included within the scope of the appended claims.

What is claimed is:

1. An airplane comprising in combination, a cargo body having top, bottom and side enclosing walls forming a cargo compartment and having a loading opening in a wall thereof other than the top wall and having one edge thereof located at the bottom wall of said compartment, landing gear for supporting said airplane with its body above a supporting surface such as the ground, closure means for said body loading opening hinged at one edge to a bottom wall of the cargo compartment along the said edge of the opening which is located at the bottom wall and having a free edge adapted to rest on the supporting surface when swung down, said closure having such small inclination when lowered to the supporting surface as to form a low-angle passageway from the supporting surface to the bottom of the compartment, and length-adjustable strut means between the body and closure constructed and arranged to lock in any adjusted position for pushing the free edge of the closure down against the supporting surface and bracing the body thereabove.

2. An airplane comprising in combination a cargo body having top, bottom and side enclosing walls forming a cargo compartment and having a loading opening in a wall thereof other than the top wall and having one edge thereof located at the bottom wall of said compartment, landing gear for supporting said airplane with the body above a supporting surface such as the ground, closure means for said body loading opening hinged at one edge to a bottom wall of the cargo compartment along the said edge of the opening which is located at the bottom wall and having a free edge adapted to rest on the supporting surface when swung down, said closure having such small inclination when lowered to the supporting surface as to form a low-angle passageway from the supporting surface to the bottom of the compartment, and length-adjustable strut means between the body and closure constructed and arranged to lock in any adjusted position for pushing the free edge of the closure down against the supporting surface and bracing the body thereabove, and power means mounted on the closure means below the ramp surface and within the outer airfoil surface thereof for operating said strut to raise and lower the closure means.

3. An airplane comprising in combination a cargo body having top, bottom and side enclosing walls forming a cargo compartment and having a loading opening in a wall thereof other than the top wall and having one edge thereof located at the bottom wall of said compartment, landing gear for supporting said airplane with the body above a supporting surface such as the ground, closure means for said body loading opening hinged at one edge to a bottom wall of the cargo compartment along the said edge of the opening which is located at the bottom wall and having a free edge adapted to rest on the supporting surface when swung down, said closure having such small inclination when lowered to the supporting surface as to form a low-angle passageway from the supporting surface to the bottom of the compartment, and length-adjustable strut means between the body and closure constructed and arranged to lock in any adjusted position for pushing the free edge of the closure down against the supporting surface and bracing the body thereabove, said strut means including screw and nut elements, and power means for driving one of said elements for adjusting the position of the closure relative to the body and supporting surface and holding the closure means locked when the power means is not active in any adjusted position.

4. An airplane comprising in combination, a cargo body having top, bottom and side enclosing walls forming a cargo compartment with a floor and having a loading opening in a wall thereof other than the top wall, the opening having one end thereof located at the bottom wall of said compartment at the floor and being of such size and having such clearances as to permit loading and unloading of the compartment through the opening, landing gear for supporting the airplane with its body above a supporting surface such as the ground with the floor in approximately horizontal position, an elongated passageway member movably supported in the body at the opening in such manner that one end can be lowered to the supporting surface and that the other end is carried by the body at the floor level at the said end of the opening located at the bottom wall, the passageway member being of sufficient length as to establish a small angle with the supporting surface when lowered while leaving ample loading clearances at the opening, and means interacting between the body and the passageway member constructed and arranged to hold the member with its lower end rigidly against the supporting surface, whereby the supporting member assists the landing gear in supporting the body with the floor in horizontal position.

5. An airplane comprising in combination, a cargo body having top, bottom and side enclosing walls forming a cargo compartment with a floor and having a loading opening in a wall thereof other than the top wall, the opening having one end thereof located at the bottom wall of said compartment at the floor and being of such size and having such clearances as to permit loading and unloading of the compartment through the opening, landing gear for supporting the airplane with its body above a supporting surface such as the ground with the floor in approximately horizontal position, an elongated passageway member movably supported in the body at the opening in such manner that one end can be lowered to the supporting surface and that the other end is carried by the body at the floor level at the said end of the opening located at the bottom wall, the passageway member being of sufficient length as to establish a small angle with the supporting surface when lowered while leaving ample loading clearances at the opening, means interacting between the body and the passageway member constructed and arranged to hold the member with its lower end rigidly against the supporting surface, whereby the supporting member assists the landing gear in supporting the body with the floor in horizontal position, and means for raising said passageway member into its upper position relative to the body.

6. An airplane comprising in combination, a cargo body having top, bottom and side walls forming a cargo compartment with a generally horizontal floor, the body also including a tail extension having an inclined bottom wall extending upward at an angle from the rear end of the bottom wall and floor of said compartment, the airplane having landing gear supporting it in front of the rear end of the floor and the tail extension whereby there is an overturning tendency when a load is disposed on the rear end of the floor, said tail extension having a loading opening in the inclined bottom wall, the opening extending rearwardly from the rear end of said compartment floor and being of such size and having such clearances as to permit loading and unloading of the compartment through the opening, a ramp hinged in said tail extension opening to swing about a hinge line at the rear end of the compartment floor, the ramp being of sufficient length as to establish a small angle with the supporting surface when lowered while leaving ample loading clearances at the opening, and means interacting between the body and the ramp constructed and arranged to hold the ramp with its lower end rigidly against the supporting surface, whereby the ramp assists the landing gear in supporting the body against overturning tendency.

MICHAEL WATTER.

REFERENCES CITED

The following references are of record in the file of this patent:

UNITED STATES PATENTS

| Number | Name | Date |
|---|---|---|
| D. 117,695 | McDonnell | Nov. 21, 1939 |
| 1,516,295 | Huntington | Nov. 18, 1924 |
| 2,176,461 | Larsen | Oct. 17, 1939 |
| 1,882,338 | Reed | Oct. 11, 1932 |
| 1,979,011 | Potez | Oct. 30, 1934 |
| 2,095,440 | Hojnowski | Oct. 12, 1937 |
| 2,268,009 | Babb | Dec. 30, 1941 |
| 2,315,117 | Freytag | Mar. 30, 1943 |
| 1,275,746 | Rainey | Aug. 13, 1918 |
| 2,242,201 | Woods | May 13, 1941 |

FOREIGN PATENTS

| Number | Country | Date |
|---|---|---|
| 510,464 | Great Britain | Aug. 2, 1939 |
| 447,234 | Germany | July 18, 1927 |
| 566,319 | Germany | Dec. 14, 1932 |
| 742,096 | France | Dec. 21, 1932 |

OTHER REFERENCES

Publication, "Popular Mechanics," issue of May 1939, page 703.